(12) United States Patent
Muir et al.

(10) Patent No.: US 11,401,664 B2
(45) Date of Patent: Aug. 2, 2022

(54) MACHINE HEIGHT SENSOR SYSTEM AND METHOD

(71) Applicant: Caterpillar Paving Products Inc., Brooklyn Park, MN (US)

(72) Inventors: Jason W. Muir, Andover, MN (US); Nathaniel S. Doy, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 17/123,257

(22) Filed: Dec. 16, 2020

(65) Prior Publication Data
US 2022/0186448 A1 Jun. 16, 2022

(51) Int. Cl.
*E01C 23/088* (2006.01)
*E01C 23/12* (2006.01)
*G05D 1/02* (2020.01)
*G01B 5/18* (2006.01)

(52) U.S. Cl.
CPC .......... *E01C 23/088* (2013.01); *E01C 23/127* (2013.01); *E01C 2301/00* (2013.01); *G01B 5/18* (2013.01); *G05D 1/0231* (2013.01)

(58) Field of Classification Search
CPC . E02F 3/848; E02F 3/783; E02F 3/844; E02F 3/845; E02F 3/847; E02F 4/145; E02F 9/264; E02F 9/265; E02F 5/145; E01C 23/065; E01C 23/088; E01C 23/127; E01C 2301/00; G01B 5/18; G05D 1/0231
See application file for complete search history.

(56) References Cited

U.S. PATENT DOCUMENTS

| 5,288,167 | A | * | 2/1994 | Gaffard | ................ | E01C 19/006 |
| | | | | | | 356/139.04 |
| 5,294,210 | A | * | 3/1994 | Lemelson | ............ | B05B 12/122 |
| | | | | | | 404/108 |
| 8,082,084 | B2 | | 12/2011 | Nichols | | |
| 9,879,391 | B2 | | 1/2018 | Berning et al. | | |
| 9,963,841 | B2 | | 5/2018 | Nacke et al. | | |
| 10,640,933 | B2 | | 5/2020 | Payne et al. | | |
| 2008/0003057 | A1 | * | 1/2008 | Hall | ........................ | E01C 19/22 |
| | | | | | | 404/84.1 |
| 2016/0356004 | A1 | * | 12/2016 | Berning | .................... | G01C 5/00 |
| 2017/0284040 | A1 | * | 10/2017 | Berning | .................... | G01B 5/18 |
| 2020/0122542 | A1 | | 4/2020 | Engelmann et al. | | |
| 2020/0131722 | A1 | * | 4/2020 | Winkels | ................ | E01C 23/088 |

* cited by examiner

*Primary Examiner* — Janine M Kreck
*Assistant Examiner* — Michael A Goodwin
(74) *Attorney, Agent, or Firm* — Bookoff McAndrews PLLC

(57) ABSTRACT

A milling machine having a height-adjustable machine body includes a longitudinal axis and a lateral axis, a plurality of traction elements, a milling rotor assembly; and a machine height sensor system. The machine height sensor system includes a plurality of laterally adjustable machine height sensors and a plurality of position sensors, each associated with a respective height sensor and measuring a lateral extent of the height sensors.

20 Claims, 5 Drawing Sheets

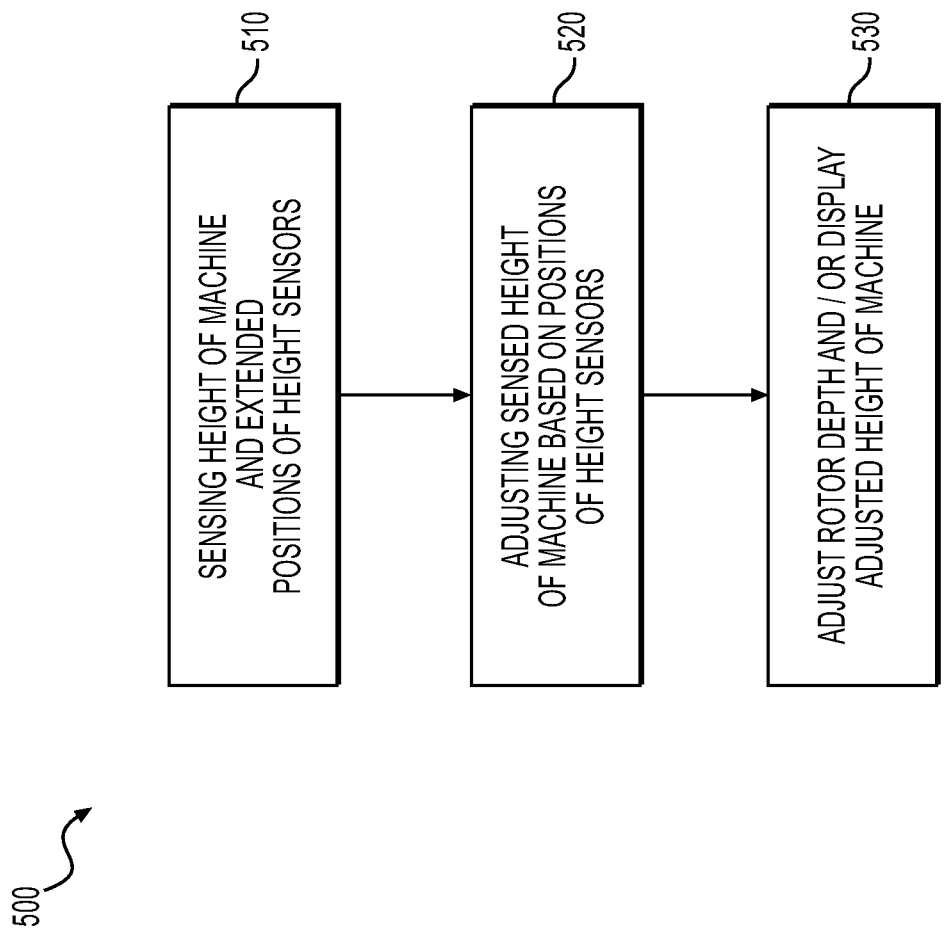

MACHINE HEIGHT SENSOR SYSTEM AND METHOD

TECHNICAL FIELD

The present disclosure relates generally to operation of a milling machine and, more particularly, to a system and a method for controlling height parameters of a milling machine.

BACKGROUND

Milling machines are used in a variety of applications including removing material from a ground surface, stabilizing soil, surface mining, and mixing milled materials into a ground surface, among other things. These milling machines include rotary mixers and cold planers. Rotary mixers (also known as reclaimers or stabilizers), in particular, are used to pulverize a ground surface, such as roadways based on asphalt, and mix a resulting pulverized layer with an underlying base, to stabilize the ground surface. Rotary mixers may also be used as a soil stabilizer to cut, mix, pulverize, and stabilize a soil surface, for attaining a strengthened soil base. Optionally, rotary mixers may add asphalt emulsions or other binding agents during pulverization to create a reclaimed surface.

Many job sites have uneven ground for the rotary mixers to mill, and such uneven ground will directly affect the depth of milling. In order to maintain a desired depth of milling when traversing uneven ground, the height of the milling machine should be monitored. This monitoring of machine height can be challenging, especially when the machine frame or body is not parallel with the ground.

U.S. Pat. No. 9,879,391 ('391 reference) discloses a method for measuring a milling depth of a road milling machine with a ground engaging sensor located on the road milling machine. The method includes measuring a milling depth of a milling track, the measuring including detecting a measurement value of a ground engaging sensor engaging the milling track. Measuring is done by a pair of sensors, one of which rests on the ground or traffic surface, and the other which is lowered onto the bottom of the milling track, which results in an accurate reading of the milling depth. The '391 patent does not address, inter alia, height measurements on sloping or uneven ground.

The system and method of the current disclosure may solve one or more of the problems set forth above and/or other problems in the art. The scope of the current disclosure, however, is defined by the attached claims, and not by the ability to solve any specific problem.

SUMMARY OF THE INVENTION

In one aspect the present disclosure includes a milling machine having a height-adjustable machine body including a longitudinal axis and a lateral axis, a plurality of traction elements, a milling rotor assembly; and a machine height sensor system. The machine height sensor system includes a plurality of laterally adjustable machine height sensors and a plurality of position sensors, each associated with a respective height sensor and measuring a lateral extent of the height sensors.

In another aspect of the present disclosure, a method for controlling a milling machine is provided. The machine includes a height-adjustable machine body having a longitudinal axis and a lateral axis, a plurality of traction elements, a milling rotor assembly, and a machine height sensor system including a plurality of laterally adjustable machine height sensors, and a plurality of position sensors, each associated with a respective height sensor and measuring a lateral extent of the height sensors. The method includes adjusting a height of a milling rotor of the milling rotor assembly based on the information received from the plurality of machine height sensors and associated position sensors.

In yet another aspect of the present disclosure, a milling machine includes a height-adjustable machine body having a longitudinal axis and a lateral axis, a plurality of traction elements, a milling rotor assembly, and a machine height sensor system. The machine height sensor system includes a plurality of laterally adjustable machine height sensors, a plurality of position sensors, each associated with a respective height sensor and measuring a lateral extent of the height sensors, and an operator-controllable drive system coupled to each of the laterally adjustable machine height sensors. The milling machine also includes a controller coupled to the plurality of machine height sensors and associated position sensors, the controller configured to adjust a height of a milling rotor of the milling rotor assembly based on the information received from the plurality of machine height sensors and associated position sensors

BRIEF DESCRIPTION OF THE DRAWINGS

FIG. 5 illustrates a method of height determination of the milling machine of FIG. 1.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Milling machines may be used for reclaiming, milling, stabilizing, or otherwise manipulating ground surfaces. A rotary mixer or road reclaimer type milling machine will be described in this disclosure, however, it is understood that this disclosure is applicable to other types of milling machines, such as cold planers, and any other height-adjustable mobile industrial machines. As disclosed herein, the term "ground surface" is used broadly to refer to all types of surfaces that form typical roadways (e.g., asphalt, cement, clay, sand, dirt, etc.) or surfaces that can be conditioned to form roadways. Further, it is understood that references to rotating and non-rotating components are exemplary, and that such a reference includes components that move relative to one another, and thus non-rotating is not limited to only stationary components.

Figure 1:
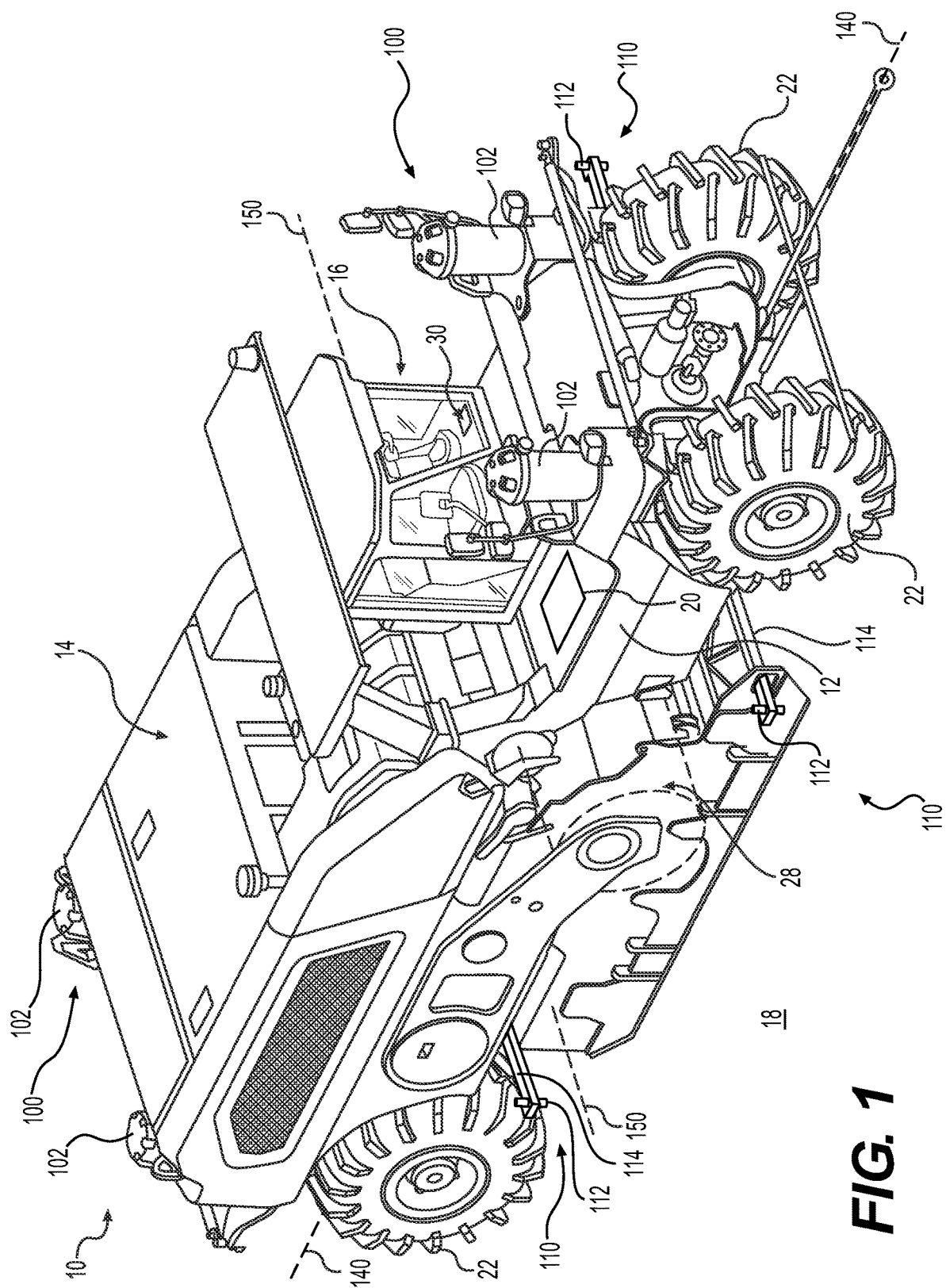
FIG. 1 illustrates a milling machine in accordance with the present disclosure.

FIG. 1 illustrates a rotary mixer machine 10 including a frame or body 12 supported on a ground surface 18 by two sets of traction elements 22, such as wheels. Rotary mixer 10 further includes an internal combustion engine system 14, an operator station 16, and a rotor assembly 28 including a milling drum or rotor. The engine system 14, operator station 16, and rotor assembly 28 may take any appropriate form known in the art. The rotary mixer 10 also includes a machine height adjustment system 100, and a machine height sensor system 110, as will be discussed in more detail below. Rotary mixer 10 may further include a controller 20 and an operator display 30, both associated with the machine height adjustment system 100 and machine height sensor system 110. Rotary mixer 10 may include a generally longitudinal axis 140 extending from a front to a rear of the rotary mixer 10, and a lateral axis 150 normal to the longitudinal axis 140 and extending from one side to the other side of the rotary mixer 10.

The machine height adjustment system 100 may include a plurality of height adjustment devices 102. In the example illustrated in FIG. 1, the plurality of height adjustment devices 102 may be four hydraulic actuators 102, with two hydraulic actuators 102 on each side of the front axle, and two on each side of the rear axle of the rotary mixer 10. The hydraulic actuators 130 are configured to controllably raise or lower the frame or body 12 of the rotary mixer machine 10, and thus control the depth of the rotor of rotor assembly 28. The operator of the rotary mixer 10 may control the extension or retraction of the hydraulic actuators 102 by any appropriate user interface, such as, a joystick, dial, or touchscreen display in operator station 16.

The machine height sensor system 110 may include at least two height sensors 112 fixedly connected to a respective distal end of a plurality of laterally-extendable mounting arms 114. The mounting arms 114 may extend laterally (in the direction of lateral axis 150) on both sides of the rotary mixer 10. For example, the rotary mixer may include four mounting arms 114, one in each corner of the machine frame or body 12, with a first pair located proximate the front axle of rotary mixer 10, and a second pair located proximate the rear axle of the rotary mixer 10 (the far rear mounting arm 114 is not seen in FIG. 1). In an alternative arrangement, machine 10 may include only two height sensors 112, one located on each side of the frame or body 12 of machine 10. Even further, machine 10 may include three height sensors 112, one height sensor 112 located at the front of the machine 10, and two provided on opposite sides of the rear of the machine 10, or visa-versa. The pairs of mounting arms 114 may be collinear, in that they extend laterally at a common longitudinal position along the length of the rotary mixer 10. Further, as will be discussed in more detail below in connection with FIG. 3, the mounting arms 114 may be independently laterally-extendable.

Figure 2:
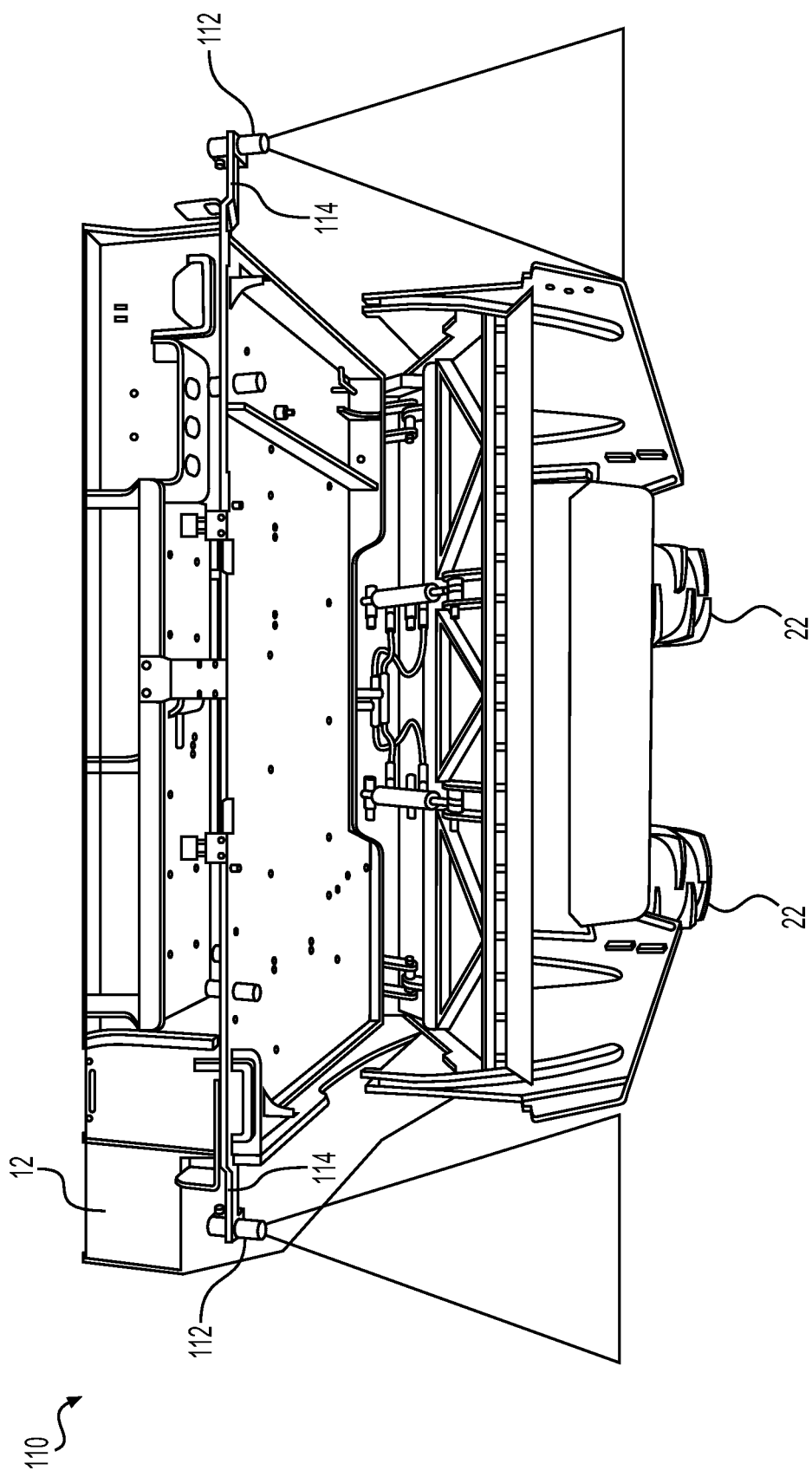
FIG. 2 illustrates an exemplary height sensor system on the milling machine of FIG. 1.

FIG. 2 illustrates an underside view of the machine height sensor system 110 (with portions of the rotary mixer 10 removed for clarity). The height sensors 112 located at the end of each laterally extendable mounting arm 114 may be of any conventional design, for example, sonic sensors, laser sensors, altimeters, or any other suitable sensor capable of outputting height data of the rotary mixer 10 to controller 20.

Figure 3:
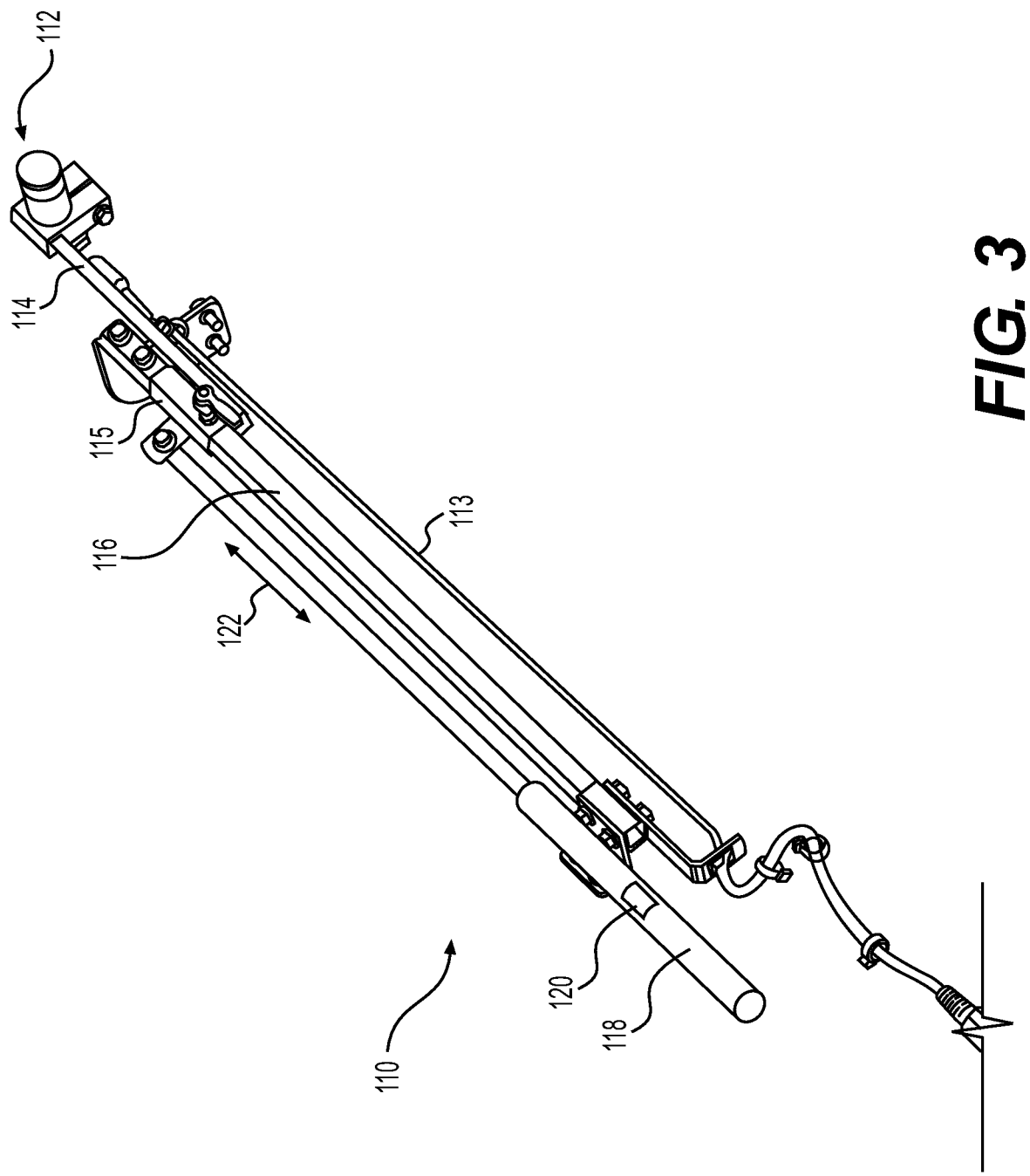
FIG. 3 further illustrates the height sensor system of FIG. 2.

FIG. 3 shows one laterally-extendable mounting arm 114 of the machine height sensor system 110 removed from the rotary mixer 10. The machine height sensor system 110 may be coupled to the underside of the frame 12 of rotary mixer 10 in any appropriate manner, such as by bolt connections. The height sensors 112 may include a coiled cable 113 (shown uncoiled in FIG. 3) connecting the height sensor 112 to the controller. It is understood, however, that height sensors 112 may be coupled to controller 20 in any appropriate manner, i.e., in a wired or wireless manner.

The laterally-extendable mounting arm 114 may include a coupling member 115 that is slidably connected to a stationary guiding rail 116 of the machine height sensor system 110. The coupling member 115 may also be connected to an operator-controlled drive system, such as a hydraulic actuator 118. In such an arrangement, extension and retraction of a rod of hydraulic actuator 118 (as shown by arrow 122) will extend or retract coupling member 115 along the stationary guiding rail 116, and thereby extend or retract the mounting arm 114 and height sensors 112 laterally toward and away from the frame 12 of rotary mixer 10. Control of the hydraulic actuator 118 may be provided to the operator of the rotary mixer 10, such as through an operator-commanded adjustment with position feedback. This could be used in a closed-loop sensor position control, or allow for a set of predefined sensor locations selected by the operator.

The machine height sensor system 110 may also include a lateral position sensor 120 for sensing/determining the extension position of the mounting arm 114. The lateral position sensor 120 may take any appropriate form to sense/determine the extension position of a mounting arm 114. For example, lateral position sensor 120 may be a cylinder extension sensor associated with hydraulic actuator 118. The lateral position sensor may determine the extension position of the mounting arm 114 with respect to a fixed location on the frame 12 of the rotary mixer 10.

It is understood that the extension and retraction of mounting arm 114, and sensing the extension position thereof, may be achieved with alternative controllable drive systems other than the hydraulic actuator 118 and associated position sensor 120. For example, the hydraulic actuator 118 could be replaced with a linear actuator or a rack and pinion controllable drive system, or the extension and retraction of the mounting arm 114 could be done manually. Further, the position sensor 120 could be a linear position sensor configured to track the movement of, for example, coupling member 115, or the position sensor 120 could be a rotary sensor used, for example, in association with a rack and pinion system moving the mounting arm 114.

Figure 4:
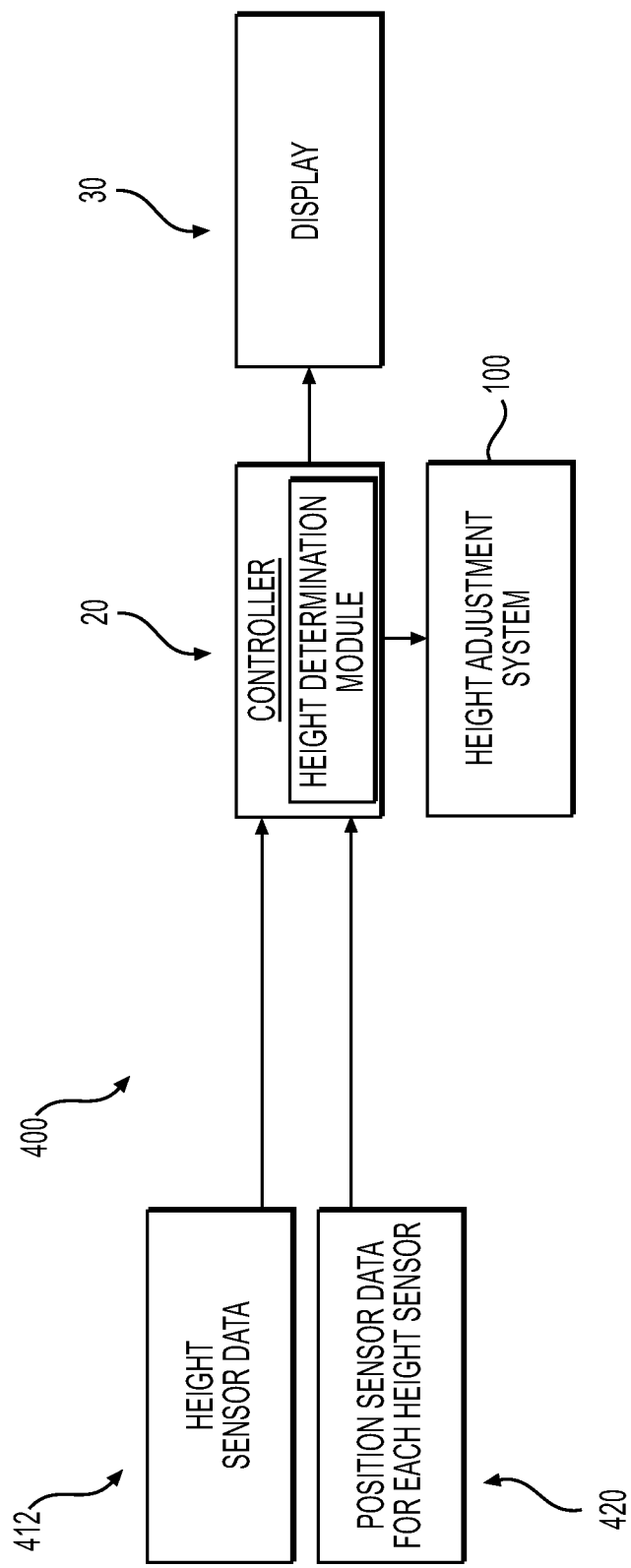
FIG. 4 illustrates a machine height determination system of the milling machine of FIG. 1.

FIG. 4 illustrates a machine height determination system 400 including controller 20 receiving inputs 412, 420 from each of the height sensors 112 and lateral position sensors 120 of the machine height sensor system 110, and sending outputs to height adjustment system 100 and/or display 30 of rotary mixer 10. Controller 20 may embody a single microprocessor or multiple microprocessors, and may include a memory, a secondary storage device, and a processor, such as a central processing unit or any other means for accomplishing a task consistent with the present disclosure. The memory or secondary storage device associated with controller 20 may store data and/or software routines that may assist controller 20 in performing its functions. For example, the controller 20 may include software and/or a height determination module configured to perform the functions discussed in FIG. 5 below. Further, the memory or secondary storage device associated with controller 20 may also store data received from the various inputs associated with height sensor system 100. Numerous commercially available microprocessors can be configured to perform the functions of controller 20. It should be appreciated that controller 20 could readily embody a general machine controller capable of controlling numerous other machine functions. Various other known circuits may be associated with controller 20, including signal-conditioning circuitry, communication circuitry, hydraulic or other actuation circuitry, and other appropriate circuitry. Additionally, the controller 20 may be configured to send and receive information through wired means or wireless means.

Referring to FIG. 5, a machine height determination and/or control method 500 may include a first step 510 of sensing the height of rotary mixer with the plurality of height sensors 112, and sensing the extended or lateral position of height sensors 112 via lateral position sensors 120. In step 520, the controller 20 determines an adjusted height of the machine by modifying the sensed height of the machine from the height sensor data 112 with the position data from lateral position sensors 120. The determination of the adjusted height of the machine may then be used in controller 20 to derive additional operating parameters, such as a milling drum or rotor depth of rotary mixer 10. Knowing the depth of the milling drum of the rotor assembly 28 may be used, for example, in grade or slope control of the milling of the rotary mixer 10. Finally, in step 530, the adjusted height value, or a value or machine parameter that is derived at least in part from the adjusted height value (e.g., milling drum/rotor depth), is provided to the display 30 of the rotary mixer 10, and/or the rotor depth of rotary mixer 10 is adjusted based on the adjusted machine height. Adjusting rotor depth can be achieved in any appropriate manner, for example, via the height adjustment system 100 and adjusting the height of the frame or body 12 of the rotary mixer 10.

The determination of the adjusted height (step 520) may be performed in the height determination module of the controller 20, and may include determining a height of each side of the machine without being affected by the height sensors 112 being laterally offset (i.e., not equidistant from a point about which the machine rolls). For example, during certain operations of machine 10, it may be necessary for the machine body or frame 12 to be orientated in a non-parallel orientation with the ground surface 18 such as when traversing a side slope, and it may further be desired that the height sensors 112 be laterally offset. In one application, the laterally offset position of the height sensors 112 may include positioning one height sensor 112 laterally outside of a traction element (tire) 22 on hard, un-reclaimed material, and another height sensor 112 behind a traction element 22. This situation may occur, for example, when the machine 10 is up against a sloping shoulder. In such situations, it may be difficult to determine the machine height directly from the height sensors 112, and calculations or determinations derived therefrom (e.g., depth of milling drum), may be inaccurate. This results from a height sensor 112 on one side of rotary mixer 10 deviating from the ground surface 18 significantly more than another height sensor 112 on the same side of the rotary mixer 10.

As noted above, the height determination module of controller 20 can be used to determine adjusted machine height values in controller 20. In one example, the height determination module can derive the height values through a kinematic model that uses the distance of height sensors 112 from a fixed point on frame or body 12 (based on readings from position sensors 120) to determine an orientation of the machine frame 12, and from there, the height of both sides of the machine 10 can be determined. The height of the sides of machine 10 can then be used to determine rotor depth, and if any adjustments to the rotor depth are necessary.

As noted above, in step 530 the milling drum or rotor height/depth can be adjusted based on the updated machine height of step 520, and/or the adjusted machine height value (or any value or parameter derived therefrom) may be provided to display 30 of rotary mixer 10. Display 30 may take any appropriate form, such as a touch screen display, and may provide a user interface for the operator of the rotary mixer 10. For example, the display 30 may display various operating parameters of rotary mixer 10, such as machine height, individual height sensor 112 values, milling drum depth, etc., and the operator may input desired values for the operating parameters into the display 30.

INDUSTRIAL APPLICABILITY

The present disclosure finds potential application in any milling machine, for example, rotary mixers, or any type of milling machine that allows for adjustment or control of machine height. The present disclosure facilitates effective operation of a milling machine on sloped surfaces by providing machine height determinations even when height sensors 112 are laterally offset and the body or frame 12 is not parallel to the ground surface 18. The adjusted machine height determined may provide for more accurate operation of the rotary mixer 10. For example, the determination of a more accurate machine height may assist in maintaining a more accurate desired milling depth derived from the machine height. With improved accuracy of these machine operating parameters, the efficiency of the rotary mixer 10 at a work site may be improved.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. For example, while the disclosure discusses determining an adjusted sensed height of the rotary mixer 10, it is understood that determination of that actual value is not required, but the system may merely determine the derived values, or adjust operating parameters based on the sensed values. It is intended that the specification and examples be considered as exemplary only, with a true scope and spirit of the invention being indicated by the following claims.

What is claimed is:
1. A milling machine, comprising:
   a height-adjustable machine body having a longitudinal axis and a lateral axis;
   a plurality of traction elements;
   a milling rotor assembly coupled to the height-adjustable machine body so as to change height with a height-adjustment of the height-adjustable machine body; and
   a machine height sensor system coupled to the height-adjustable machine body so as to change height with a height-adjustment of the height-adjustable machine body, the machine height sensor system including:
      a plurality of laterally adjustable machine height sensors configured to determine at least one of a depth of the milling rotor assembly or a height of the height-adjustable machine body; and
      a plurality of position sensors, each associated with a respective height sensor and measuring a lateral extent of the height sensors.
2. The milling machine of claim 1, wherein the plurality of laterally adjustable machine height sensors includes at least three sensors.

3. The milling machine of claim 1, further including a controllable drive system having a plurality of mounting arms coupled to the plurality of laterally adjustable machine height sensors, respectively, and the plurality of position sensors, respectively.

4. The milling machine of claim 3, wherein the position sensors are coupled with the controllable drive system.

5. The milling machine of claim 3, wherein each mounting arm includes a coupling member slideably coupled to a guiding rail and a hydraulic actuator coupled to the coupling member.

6. The milling machine of claim 1, wherein the laterally adjustable machine height sensors are manually adjustable.

7. The milling machine of claim 1, further including a machine height adjustment system including a plurality of hydraulic actuators for adjusting the height of the machine body.

8. The milling machine of claim 7, wherein the machine is a rotary mixer machine.

9. The milling machine of claim 1, further including a controller coupled to the plurality of machine height sensors and associated position sensors, the controller configured to determine at least one of a machine height or a milling rotor depth based on vertical heights sensed from the plurality of machine height sensors and lateral positions sensed from the associated position sensors.

10. The milling machine of claim 9, wherein the height of the machine body and the milling rotor depth is adjusted based on the at least one determined machine height or milling rotor depth.

11. The milling machine of claim 9, wherein at least one of the determined machine height or milling rotor depth are displayed on a display of the milling machine.

12. A method for controlling a milling machine having a height-adjustable machine body having a longitudinal axis and a lateral axis, a plurality of traction elements, a milling rotor assembly coupled to the height-adjustable machine body, and a machine height sensor system including a plurality of laterally adjustable machine height sensors coupled to the height-adjustable machine body, and a plurality of position sensors, each associated with a respective height sensor and measuring a lateral extent of the height sensors, the method including:
  sensing a vertical distance using each machine height sensor;
  sensing a lateral position along the lateral axis of each machine height sensor using the plurality of position sensors; and
  adjusting a height of a milling rotor of the milling rotor assembly based on vertical distances and lateral positions received from the plurality of machine height sensors and associated position sensors, wherein adjusting the height of the milling rotor results in adjusting the height of the plurality of machine height sensors and the plurality of position sensors.

13. The method of claim 12, wherein the adjusting of the height of the milling rotor includes adjusting a height of the machine body, and wherein the milling machine is configured to travel in a longitudinal direction.

14. The method of claim 12, further including determining at least one of a machine height or a milling rotor depth based on data from the plurality of machine height sensors and associated position sensors.

15. The method of claim 14, further including displaying at least one of a machine height or a milling rotor depth on a display of the milling machine.

16. The method of claim 12, further including positioning the laterally adjustable machine height sensors in a laterally offset manner.

17. A milling machine, comprising:
  a height-adjustable machine body having a longitudinal axis and a lateral axis;
  a plurality of traction elements;
  a milling rotor assembly coupled to the height-adjustable machine body such that a height of the milling rotor assembly is adjusted when a height of the height-adjustable machine body is adjusted;
  a machine height sensor system coupled to the height adjustable machine body such that a height of the machine height sensor system is adjusted when the height of the height-adjustable machine body is adjusted, the machine height sensor system including:
    a plurality of laterally adjustable machine height sensors;
    a plurality of position sensors, each associated with a respective height sensor and measuring a lateral extent of the height sensors; and
    an operator-controllable drive system coupled to each of the laterally adjustable machine height sensors; and
  a controller coupled to the plurality of machine height sensors and associated position sensors, the controller configured to adjust a height of a milling rotor of the milling rotor assembly based on a vertical distance and associated lateral position received from the plurality of machine height sensors and associated position sensors.

18. The milling machine of claim 17, wherein:
  the milling machine is a rotary mixer machine;
  the rotary mixer further includes a machine height adjustment system including a plurality of hydraulic actuators for adjusting the height of the machine body;
  controlling the height of the milling rotor includes controlling the plurality of hydraulic actuators to control the height of the milling machine body; and
  controlling the plurality of hydraulic actuators changes a height of the machine height sensor system.

19. The milling machine of claim 17, wherein the controller determines at least one of a machine height or a milling rotor depth based on data from the plurality of machine height sensors and associated position sensors.

20. The milling machine of claim 19, wherein at least one of the machine height or the milling rotor depth are displayed on a display of the milling machine.

* * * * *